(12) United States Patent
Matsumoto et al.

(10) Patent No.: US 8,193,286 B2
(45) Date of Patent: Jun. 5, 2012

(54) ACRYLIC STAR POLYMER

(75) Inventors: Hitoshi Matsumoto, Chiba (JP); Mitsuhiro Nakamura, Ichihara (JP)

(73) Assignee: Nippon Soda Co., Ltd., Toky (JP)

( * ) Notice: Subject to any disclaimer, the term of this patent is extended or adjusted under 35 U.S.C. 154(b) by 0 days.

(21) Appl. No.: 12/929,037

(22) Filed: Dec. 23, 2010

(65) Prior Publication Data
US 2011/0098413 A1 Apr. 28, 2011

Related U.S. Application Data

(63) Continuation of application No. 11/569,725, filed as application No. PCT/JP2005/009943 on May 31, 2005, now abandoned.

(30) Foreign Application Priority Data

May 31, 2004 (JP) ................................. 2004-162081
Apr. 28, 2005 (JP) ................................. 2005-132073

(51) Int. Cl.
*C08F 297/02* (2006.01)

(52) U.S. Cl. .......... 525/305; 525/94; 525/300; 525/299; 525/302; 525/304; 525/333.3; 526/266; 526/317.1; 526/319; 528/354

(58) Field of Classification Search .................... 525/94, 525/300, 299, 302, 333.3, 304, 305; 526/266, 526/317.1, 319; 528/354
See application file for complete search history.

(56) References Cited

U.S. PATENT DOCUMENTS

| | | | |
|---|---|---|---|
| 4,767,824 A | 8/1988 | Ouhadi et al. | |
| 4,810,756 A | 3/1989 | Spinelli | |
| 5,098,959 A | 3/1992 | McGrath et al. | |
| 5,399,620 A | 3/1995 | Niessner et al. | |
| 5,756,585 A | 5/1998 | Teyssie et al. | |
| 5,914,381 A | 6/1999 | Terado et al. | |
| 6,013,735 A * | 1/2000 | Mishra et al. | 525/299 |
| 6,310,175 B1 | 10/2001 | Kobayashi et al. | |
| 6,713,564 B1 | 3/2004 | Nobuhara et al. | |
| 2003/0054286 A1 | 3/2003 | Sato et al. | |

FOREIGN PATENT DOCUMENTS

| | | |
|---|---|---|
| EP | 0 243 120 A2 | 10/1987 |
| EP | 0 408 420 A1 | 1/1991 |
| EP | 1 433 799 A2 | 6/2004 |
| EP | 1433 799 A2 | 6/2004 |
| JP | A-1-131221 | 5/1989 |
| JP | A-5-500827 | 2/1993 |
| JP | A-09-157589 | 6/1997 |
| WO | WO 96/23012 A1 | 8/1996 |
| WO | WO 00/24795 A1 | 5/2000 |

OTHER PUBLICATIONS

Varshney et al. Macromolecules 1990, 23, 2618-2622.*
Jun. 1, 2007 Korean Office Action issued in Korean Application No. 10-2006-7025144.
Aug. 4, 2008 European Search Report issued in European Application No. 05745900.0.
Sep. 13, 2005 International Search Report issued in International Application No. PCT/JP2005/009943.
Kilian et al., "Synthesis and Cleavage of Core-Labile Poly (Alkyl Methacrylate) Star Polymers", Journal of Polymer Science: Part A, Polymer Chemistry, vol. 41, pp. 3083-3093, 2003.
May 31, 2007 Korean Office Action issued in Korean Application No. 10-2006-7025144.
Sep. 6, 2007 Korean Office Action issued in Korean Application No. 10-2006-7025144.
Aug. 5, 2008 European Search Report issued in European Application No. 05745900.0.

* cited by examiner

*Primary Examiner* — Vasu Jagannathan
*Assistant Examiner* — Mark Kaucher
(74) *Attorney, Agent, or Firm* — Oliff & Berridge, PLC

(57) ABSTRACT

A method for obtaining a star polymer having a controlled ratio of a weight average molecular weight of the star polymer to a number average molecular weight of the star polymer, containing the steps of anionically polymerizing a (meth) acrylic ester having an alicyclic skeleton and a lactone ring in the presence of an anionic polymerization initiator to synthesize an arm polymer, reacting the arm polymer with a polyfunctional coupling agent, and reacting with an anionic polymerizable monomer.

8 Claims, No Drawings

ACRYLIC STAR POLYMER

CROSS-REFERENCE TO PRIOR APPLICATIONS

This is a continuation of application Ser. No. 11/569,725, filed Nov. 28, 2006, which is a National Stage Application of PCT/JP2005/009943, filed May 31, 2005, and claims the benefit of Japanese Patent Application Nos. 2004-162081, filed May 31, 2004 and 2005-132073, filed Apr. 28, 2005. The entire disclosures of the prior applications are hereby incorporated by reference herein in their entirety.

BACKGROUND

The present invention relates to an acrylic acid-based star polymer and, more particularly, to a star polymer containing a repeating unit derived from a polyacrylate as a core portion and a repeating unit derived from an acrylic ester as an arm portion.

It has been known that a star polymer is obtained by polymerizing methyl methacrylate, isobutyl methacrylate and t-butyl methacrylate using, as an initiator, diphenylhexyllithium obtained by reacting 1,1-diphenylethylene with s-butyllithium, and reacting with dicumyl alcohol dimethacrylate or 2,5-dimethyl-2,5-hexanediol dimethacrylate (see, for example, Nonpatent Document 1).

[Nonpatent Document 1] L. Kilian, et. al., J. Polymer Science, Part A, 2003, 3083.

SUMMARY

However, the molecular weight distribution of the compound is mostly 1.5 or more and it cannot be said that the molecular weight is controlled. Although a trial of applying the compound as a resist material was made by making use of acid decomposability, satisfactory properties were not obtained necessarily.

An object of the present invention is to provide an acrylic acid-based star polymer which has a controlled structure with narrow molecular weight distribution and acid decomposability.

The present inventors have intensively studied so as to achieve the above object and found that the above object can be achieved by using an organic group having a specific skeleton in an acrylic ester moiety constituting an arm portion, and using a core portion having a tertiary carbon skeleton, and thus the present invention has been completed.

That is, the present invention relates to:

(1) A star polymer characterized by containing, as a core portion, a polymer chain having a repeating unit derived from a polyacrylate which has at least two partial structures represented by formula (I):

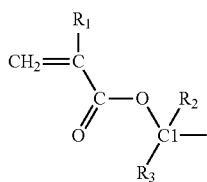

(wherein $R_1$ represents a hydrogen atom or a methyl group, $R_2$ and $R_3$ each independently represents an organic group which is combined via a carbon atom, and a C1 carbon represents a carbon atom which is combined with a moiety via a carbon atom) and, as an arm portion, a polymer chain having a repeating unit derived from an acrylate represented by formula (II):

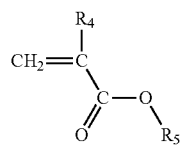

(wherein $R_4$ represents a hydrogen atom or a methyl group, and $R_5$ represents an organic group), excluding a homopolymer chain having a repeating unit derived from a (meth) acrylic ester in which $R_5$ is a C1-C4 alkyl group when $R_1$ in formula (I) is a methyl group;

(2) The star polymer described in (1), characterized in that the polyacrylate which has at least two partial structures represented by formula (I) is a diacrylate represented by formula (III):

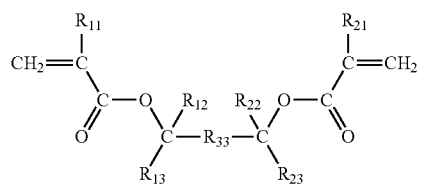

(wherein $R_{11}$ and $R_{21}$ each independently represents a hydrogen atom or a methyl group, $R_{12}$, $R_{13}$, $R_{22}$ and $R_{23}$ each independently represents an organic group which is combined via a carbon atom, and $R_{33}$ represents a divalent linking group);

(3) The star polymer described in (2), characterized in that $R_{33}$ is an unsubstituted or substituted alkylene group in formula (III);

(4) A star polymer characterized by containing an arm portion having at least one repeating unit selected from the group consisting of a repeating unit having a lactone ring and a repeating unit having an alicyclic skeleton; and (5) The star polymer described in (4), characterized by containing a core portion having a repeating unit derived from a polyacrylate having at least two partial structures represented by formula (I):

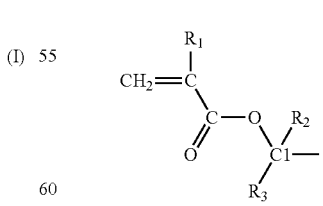

(wherein $R_1$ represents a hydrogen atom or a methyl group, $R_2$ and $R_3$ each independently represents an organic group which is combined via a carbon atom, and a C1 carbon represents a carbon atom which is combined with a moiety via a carbon atom).

DETAILED DESCRIPTION OF EMBODIMENTS

As described above, the star polymer of the present invention has a narrow molecular weight distribution and is also excellent in acid decomposability, and is therefore useful as a resist material and its industrial utility value is great.

The core portion constituting the star polymer of the present invention is characterized by containing a repeating unit derived from a polyacrylate which has at least two partial structures represented by formula (I). An acrylate includes both of an acrylic ester and a methacrylic ester. In formula (I), $R_1$ represents a hydrogen atom or a methyl group. $R_2$ and $R_3$ each independently represents an organic group which is combined via a carbon atom. In this case, the organic group means a generic term for a functional group having at least one carbon atom, and an organic group which is combined via a carbon bond means that an element at the α-position of a C1 carbon is a carbon atom. Specific examples thereof include a methyl group, ethyl group, n-propyl group, isopropyl group, n-butyl group, t-butyl group, cyclopropyl group, cyclohexyl group, benzyl group, phenethyl group, phenyl group, 1-naphthyl group, vinyl group, allyl group, ethynyl group, propargyl group, chloromethyl group, 2-chloroethyl group, 1-chloroethyl group, 2-pyridyl group and 2-pyridylmethyl group.

The C1 carbon is combined with an oxygen atom, $R_2$ and $R_3$, and also has another bonding hand that bonds to a carbon atom. That is, the bonding hand does not bond to any atoms other than the carbon atom, such as an oxygen atom or sulfur atom. The moiety terminated with a carbon atom is not specifically limited as long as it has a structure capable of having at least one partial structure represented by formula (I). Specifically, structures represented by the following Chemical Formulas 5 to 7 can be exemplified. Note that the partial structure represented by formula (I) is omitted. Two or more partial structures represented by formula (I) may be identical to or different from each other.

[Chemical Formulas 5]

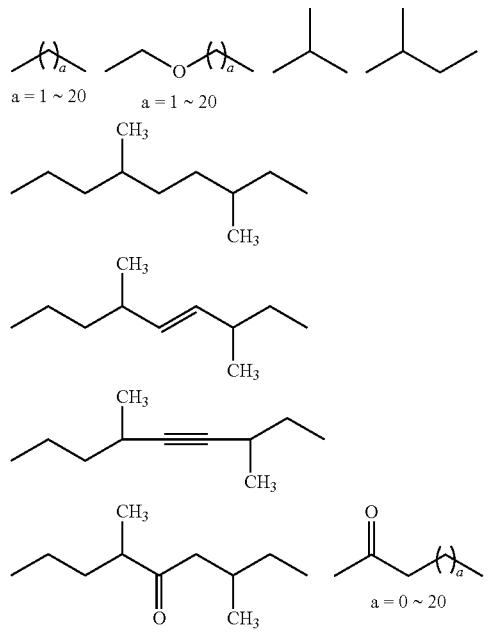

[Chemical Formulas 6]

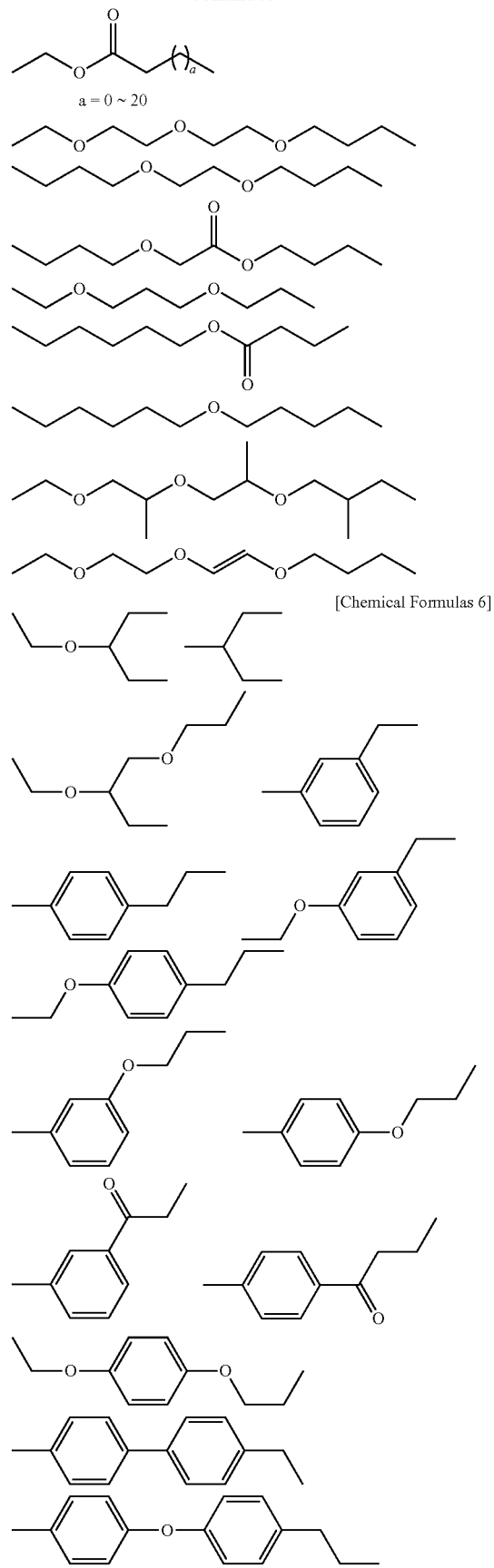

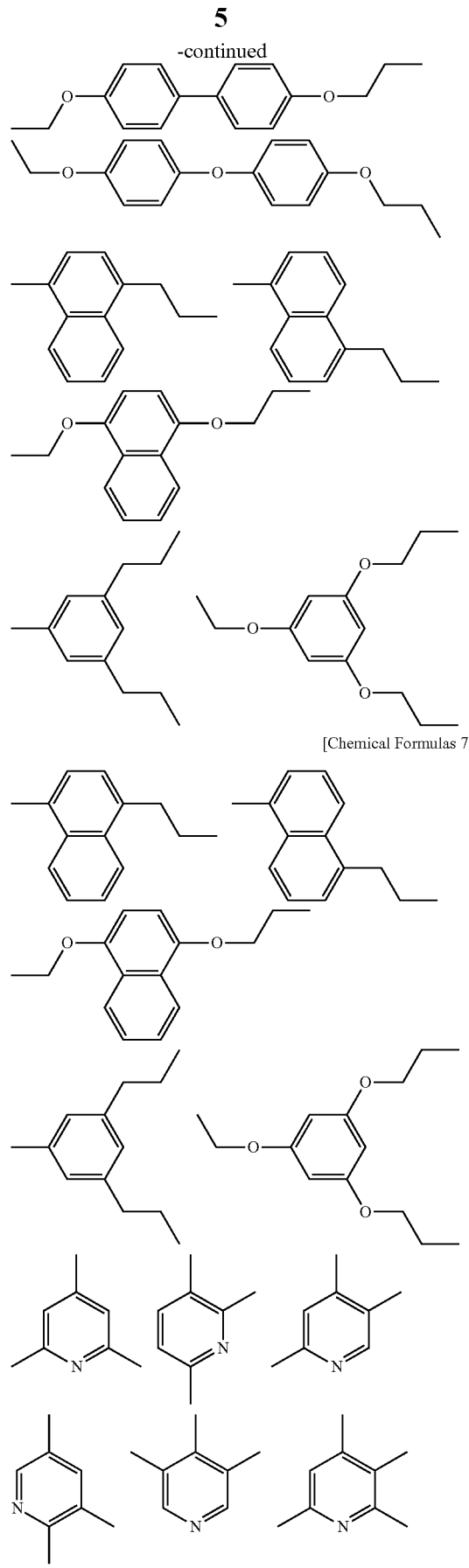

[Chemical Formulas 7]

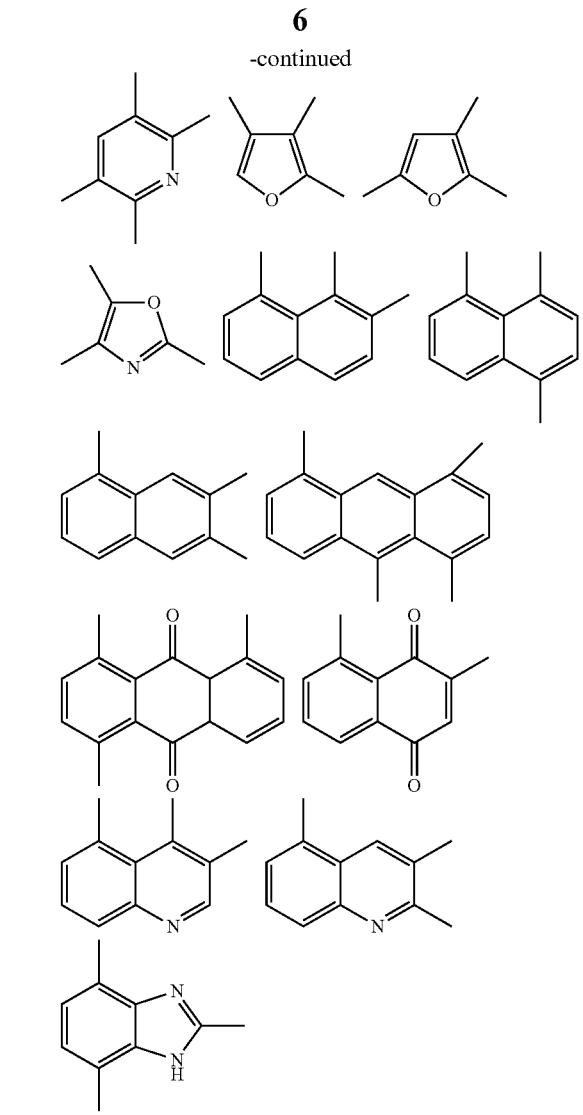

A polyacrylate represented by formula (III) can be particularly preferably exemplified. In formula (III), $R_{11}$ and $R_{21}$ each independently represents a hydrogen atom or a methyl group, $R_{12}$, $R_{13}$, $R_{22}$ and $R_{23}$ each independently represents an organic group which is combined via a carbon atom, and the same specific examples as those described in $R_2$ and $R_3$ can be exemplified. $R_{33}$ represents a divalent linking group having carbon atoms at both ends, and a divalent substituent among the substituents shown in Chemical Formulas 5 to 7 can be exemplified. Among these, $R_{33}$ is preferably an alkylene group which may have a substituent. Specific examples of the polyacrylate having at least two partial structures represented by formula (I) include the following compounds.

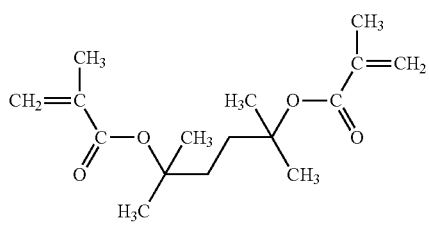

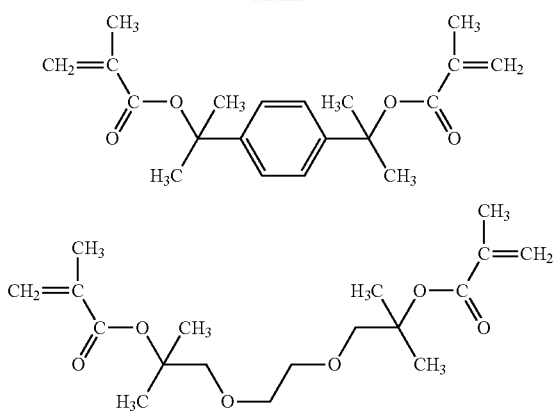

The polymer chain derived from a (meth)acrylic ester represented by formula (II) used in the present invention is characterized in that it excludes a homopolymer chain having a repeating unit derived from a (meth)acrylic ester in which $R_5$ is a C1-C4 alkyl group when $R_1$ in formula (I) is a methyl group. In formula (II), $R_4$ represents a hydrogen atom or a methyl group, and $R_5$ represents an organic group. The organic group is a generic term for a functional group having at least one carbon atom and specific examples thereof include the same groups as those described in $R_2$ and $R_3$, and an organic group having an alicyclic hydrocarbon skeleton and an organic group having a lactone ring are preferable.

Specific examples of the organic group having an alicyclic hydrocarbon skeleton include organic groups represented by the following formula (V):

-A-B (V)

In the formula, A represents a single bond, an ether group, an ester group, a carbonyl group, an alkylene group, or a divalent group as a combination thereof, and B represents any one of the following formulas (VI-1) to (VI-6).

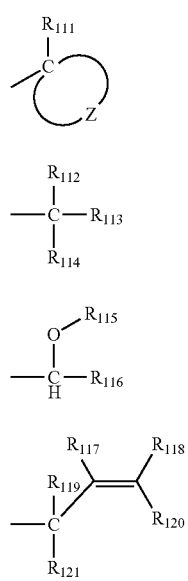

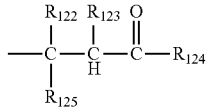

(VI-5)

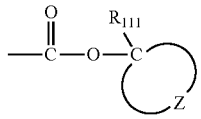

(VI-6)

In formulas (VI-1) to (VI-6), $R_{111}$ represents a C1-C5 alkyl group, and Z represents an atomic group required to form an alicyclic hydrocarbon group, together with a carbon atom. $R_{112}$ to $R_{116}$ each independently represents a hydrocarbon, a C1-C4 alkyl group which may have a linear or branched chain, or an alicyclic hydrocarbon group. At least one of $R_{112}$ to $R_{114}$, or either $R_{115}$ or $R_{116}$ represents an alicyclic hydrocarbon group. $R_{117}$ to $R_{121}$ each independently represents a hydrogen atom, a C1-C4 alkyl group which may have a linear or branched chain, or an alicyclic hydrocarbon group. At least one of $R_{117}$ to $R_{121}$ represents an alicyclic hydrocarbon group, and either $R_{119}$ or $R_{121}$ represents a C1-C4 alkyl group which may have a linear or branched chain or an alicyclic hydrocarbon group. $R_{122}$ to $R_{125}$ each independently represents a hydrogen atom, a C1-C4 alkyl group which may have a linear or branched chain, or an alicyclic hydrocarbon group. At least one of $R_{122}$ to $R_{125}$ represents an alicyclic hydrocarbon group. Specific examples of the alicyclic hydrocarbon group include skeletons represented by the following formulas.

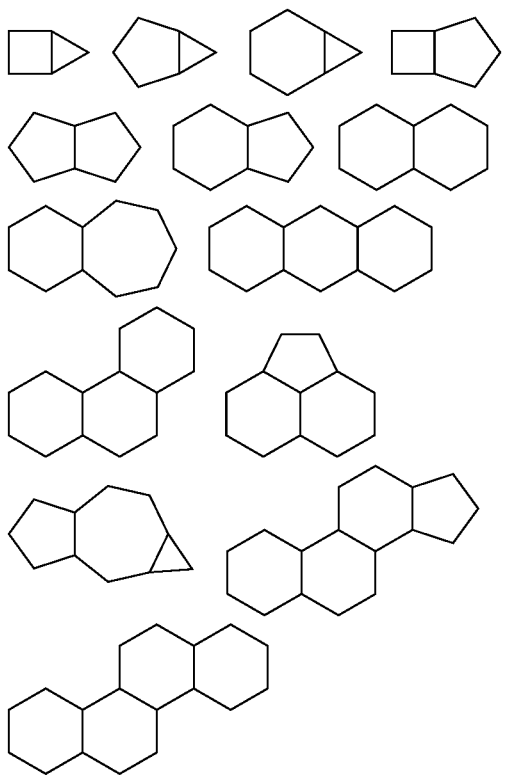

-continued

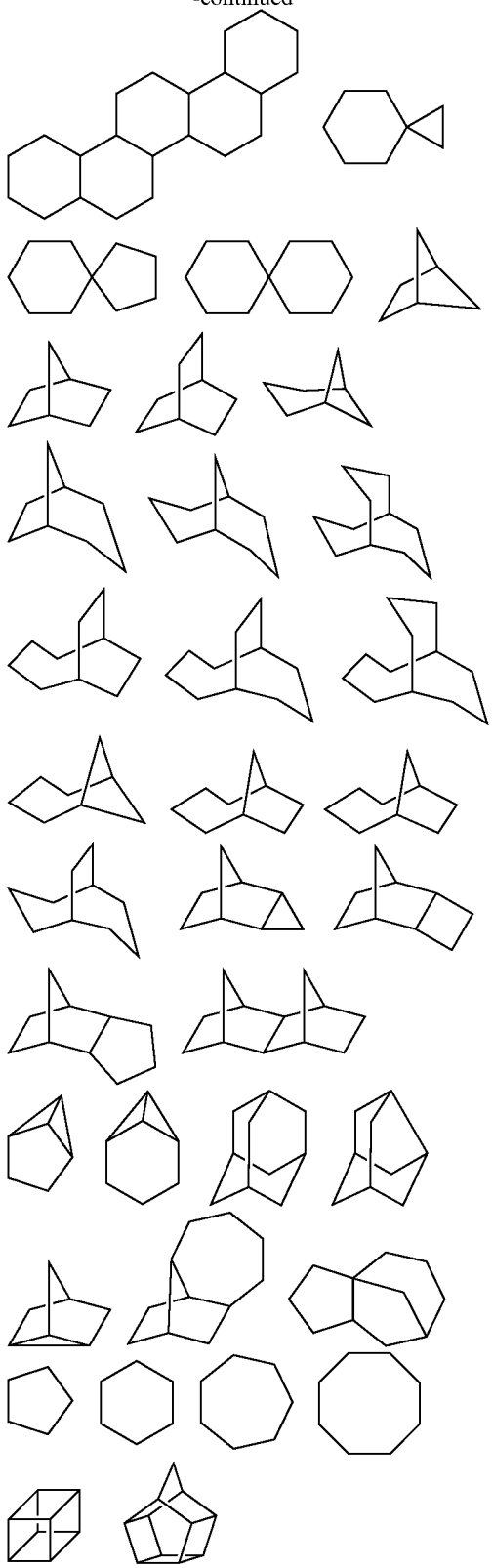

Among these, a 1-adamanthyl group and a 2-adamanthyl group are preferable, and a 2-substituted adamanthyl group represented by the following formula (VII) is preferably exemplified.

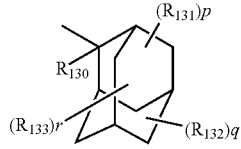

(VII)

In formula (VII), $R_{130}$ represents an alkyl group which may have a substituent, $R_{131}$ to $R_{132}$ each independently represents a halogen atom, an alkyl group, a cycloalkyl group, an alkenyl group, an alkoxy group, an alkoxycarbonyl group or an acyl group, p, q, and r each independently represents 0 or an integer of 1 to 3, and when p, q, or r is 2 or more, $R_{131}(s)$, $R_{132}(s)$ and $R_{133}(s)$ may be identical to or different from each other.

Specific examples of A include divalent groups represented by the following formulas.

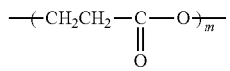

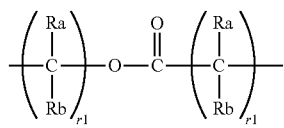

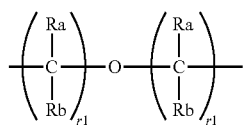

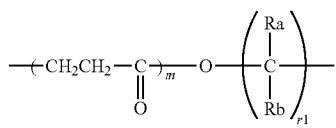

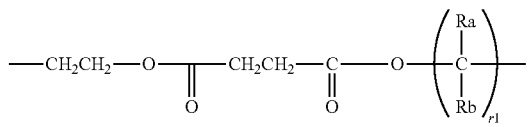

In the above formulas, Ra and Rb each independently represents a hydrogen atom, an alkyl group, a substituted alkyl group, a halogen atom or an alkoxy group, and preferably represents a lower alkyl group such as a methyl group, ethyl group, n-propyl group, isopropyl group or n-butyl group. Examples of the substituent of the substituted alkyl group include a halogen atom and alkoxy group, and examples of the alkoxy group include C1-C4 alkoxy groups such as a methoxy group, ethoxy group, propoxy group and butoxy group. Examples of the halogen atom include a chlorine atom, bromine atom, fluorine atom and iodine atom. r1 represents an integer of 1 to 10, and m represents an integer of 1 to 3.

Examples of the (meth)acrylic ester in which $R_5$ represents an alicyclic hydrocarbon group in formula (II) include compounds represented by the following formulas. In the formulas, $R_6$ and $R_7$ each independently represents a linear or branched lower alkyl group.

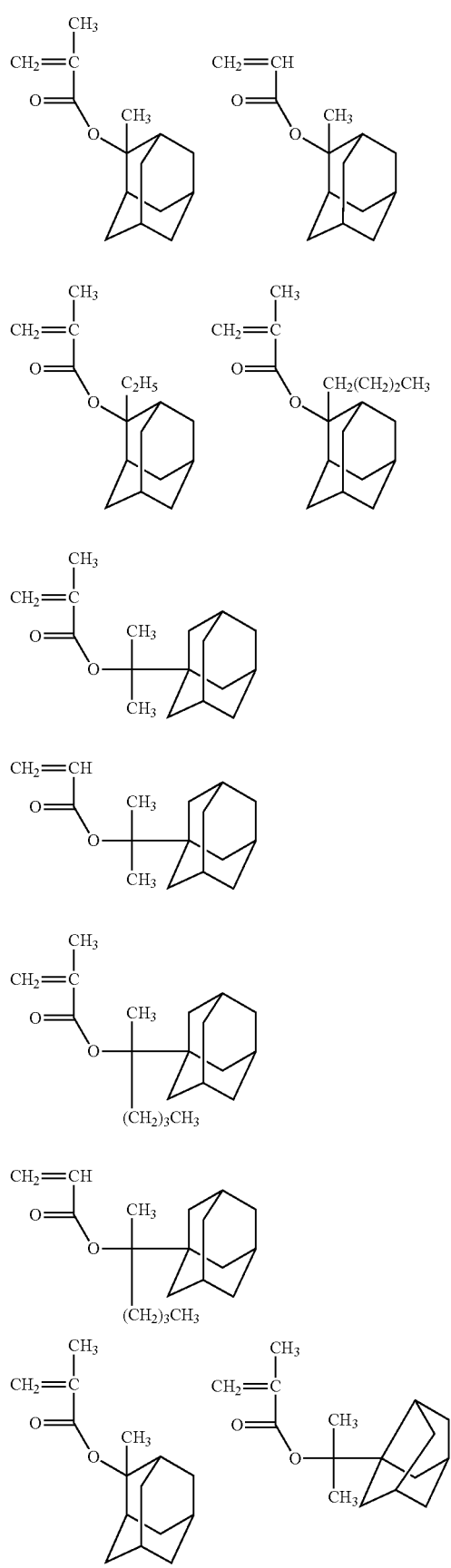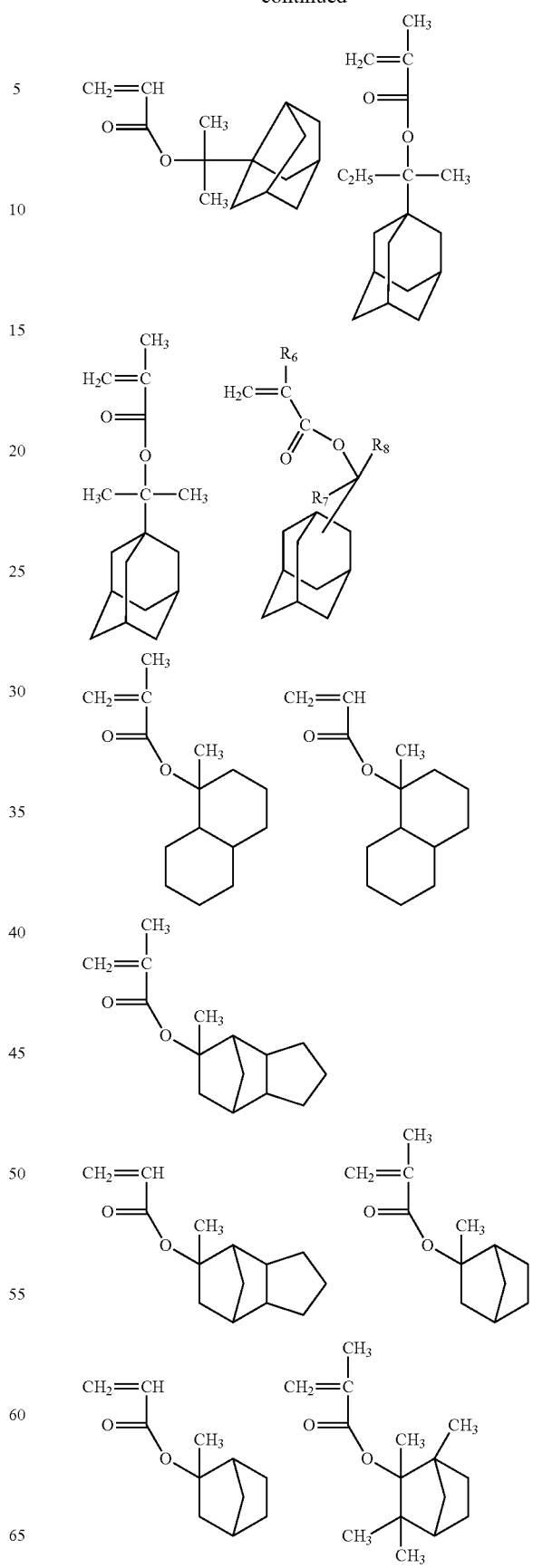

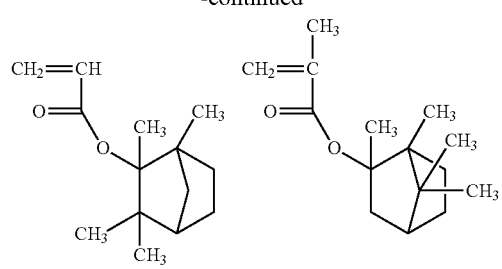
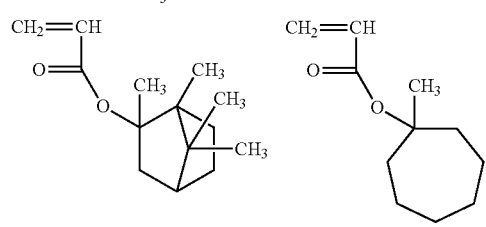
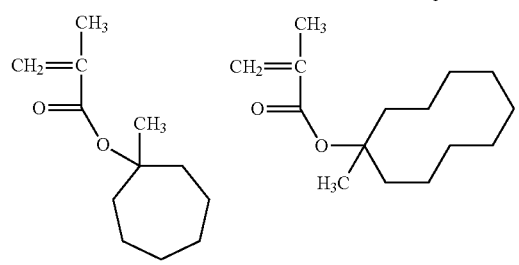
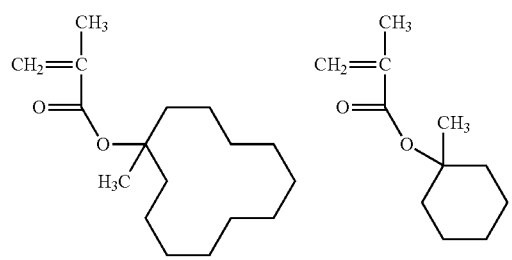
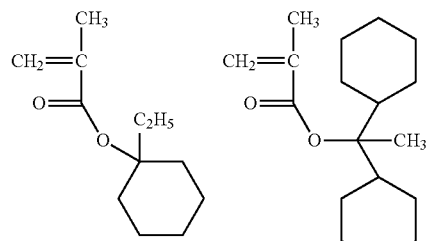
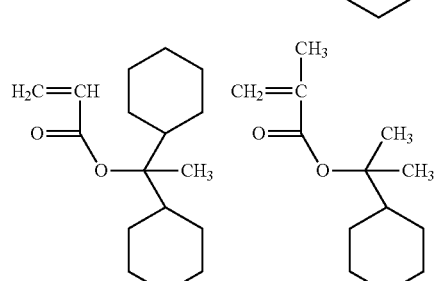
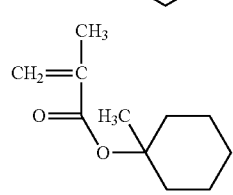
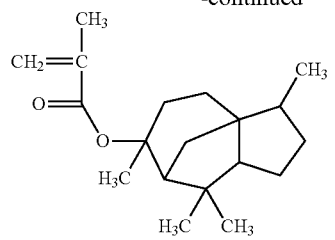
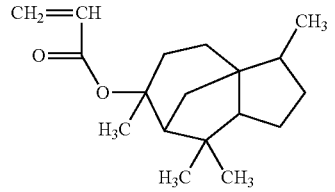
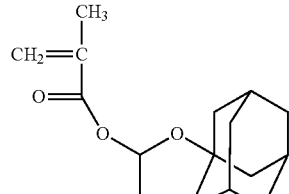
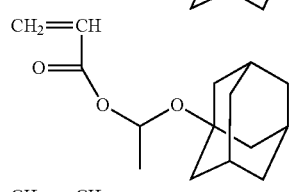
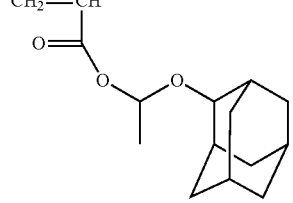
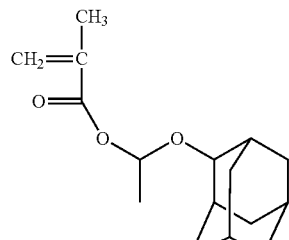
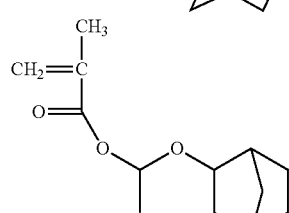
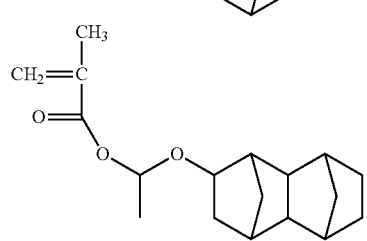

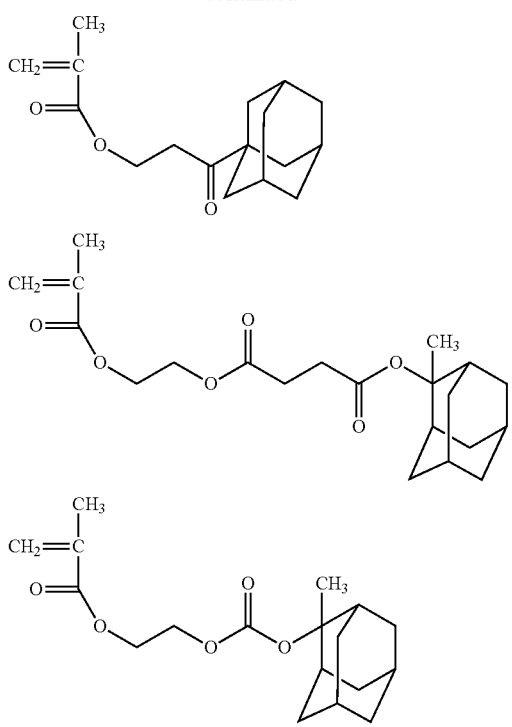

Specific examples of the (meth)acrylic ester, which has an organic group having a lactone ring, include butyrolactone acrylate, butyrolactone methacrylate, mevalonic lactone methacrylate and pantolactone methacrylate, and the organic group is preferably an organic group represented by the following formula (VIII):

-A-C  (VIII)

In the formula, A has the same meaning as that of the divalent group, and C represents any one of the following formulas (IX-1) to (IX-5).

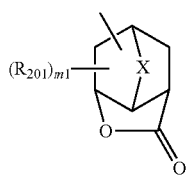 (IX-1)

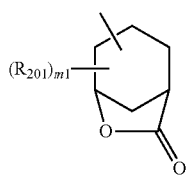 (IX-2)

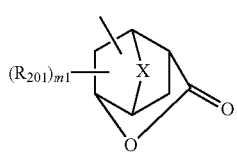 (IX-3)

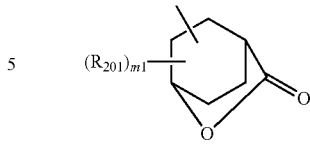 (IX-4)

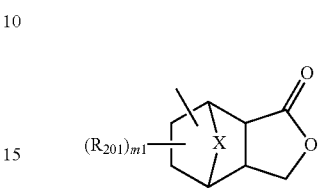 (IX-5)

In formulas (IX-1) to (IX-5), X represents an oxygen atom, a sulfur atom, or an alkylene group which may have a substituent, $R_{201}$ represents an alkyl group which may have a substituent, a cycloalkyl group, or an alkenyl group. m1 represents 0 or an integer of 1 to 5, and $R_{201}$ may be identical to or different from each other, or may be combined with each other to form a ring when m1 is 2 or more. Specific examples of the (meth)acrylic ester having a lactone ring include compounds represented by the following formulas.

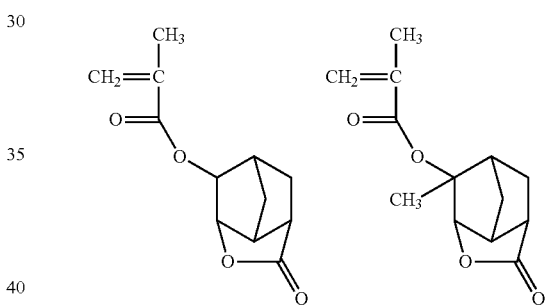

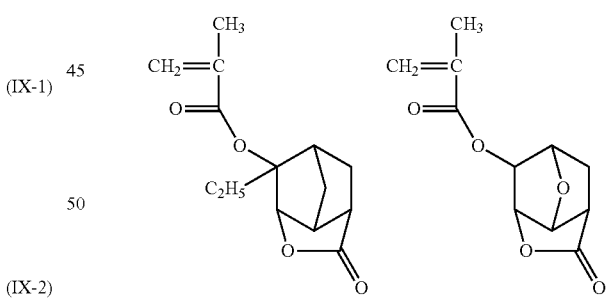

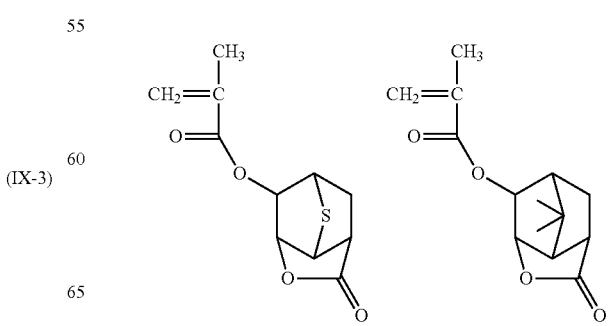

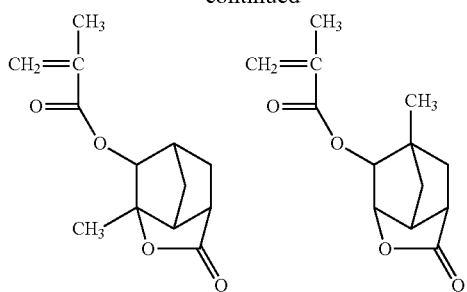
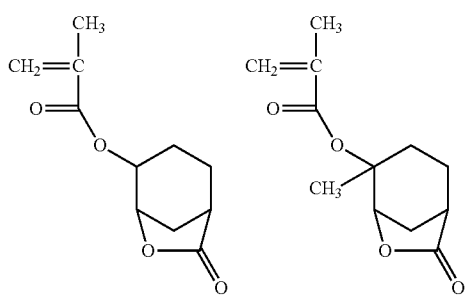
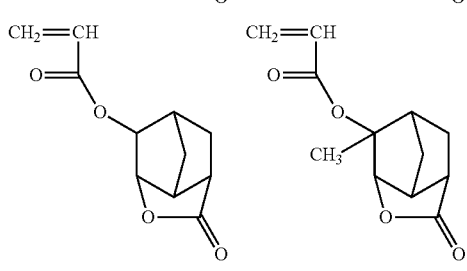
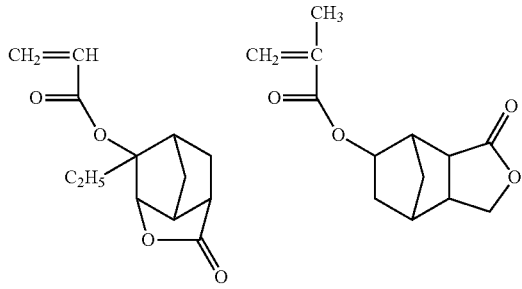
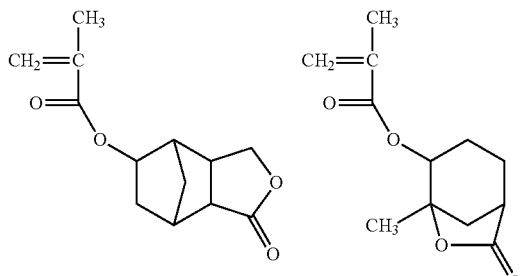
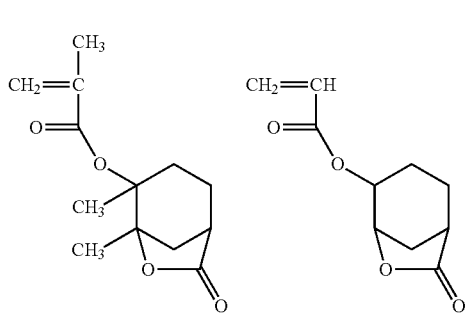
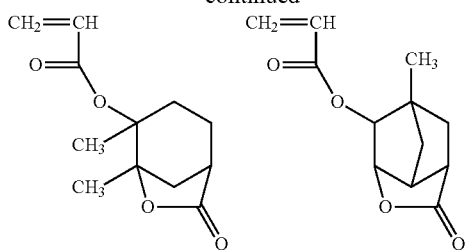
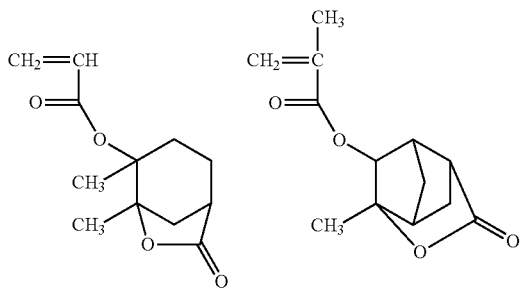
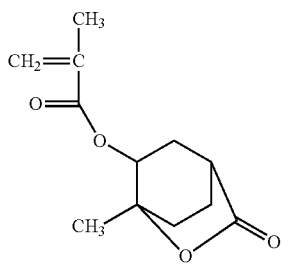
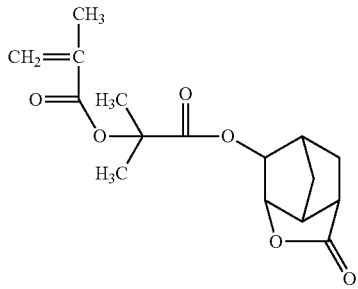
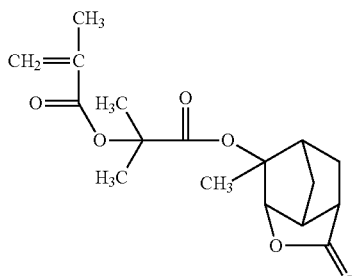
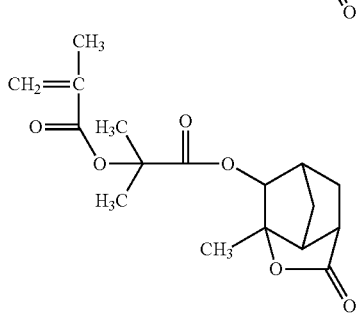

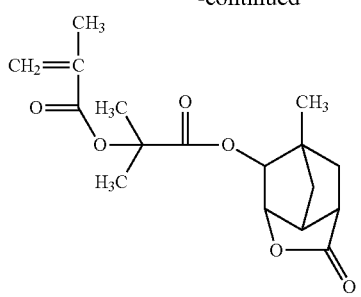
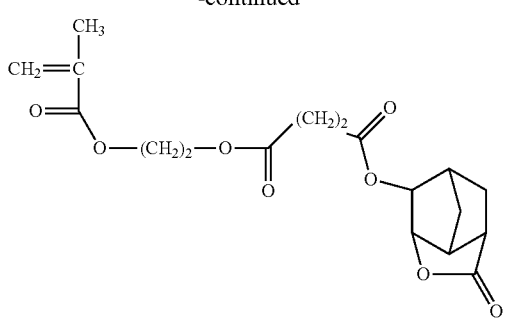
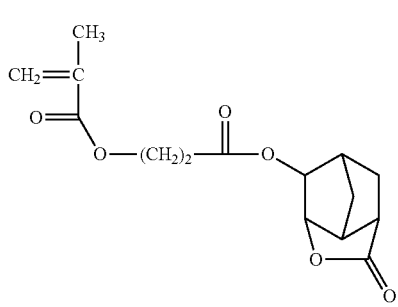
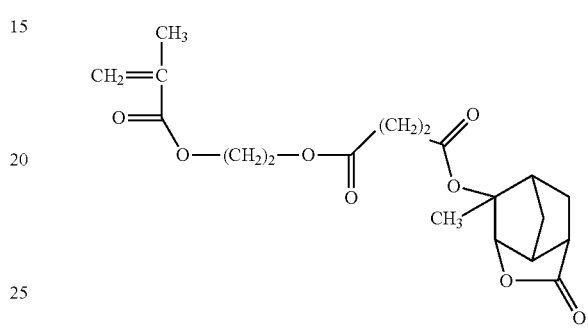
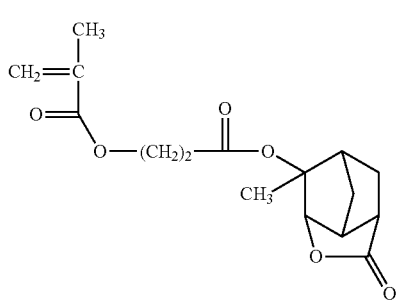
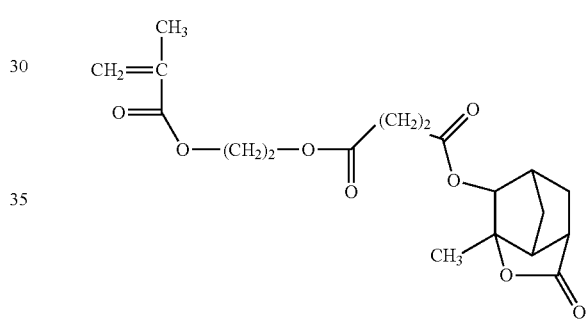
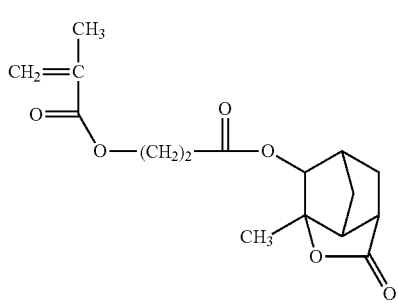
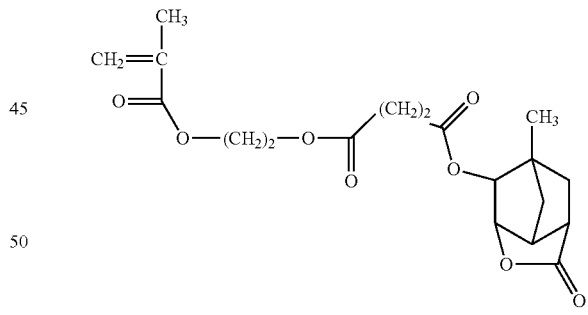
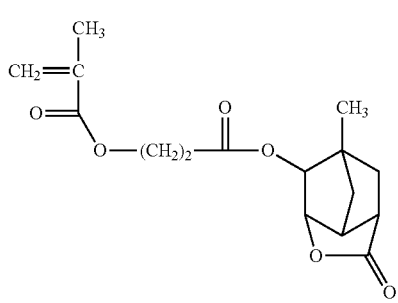
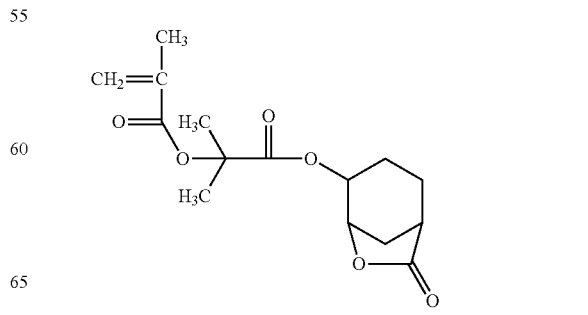

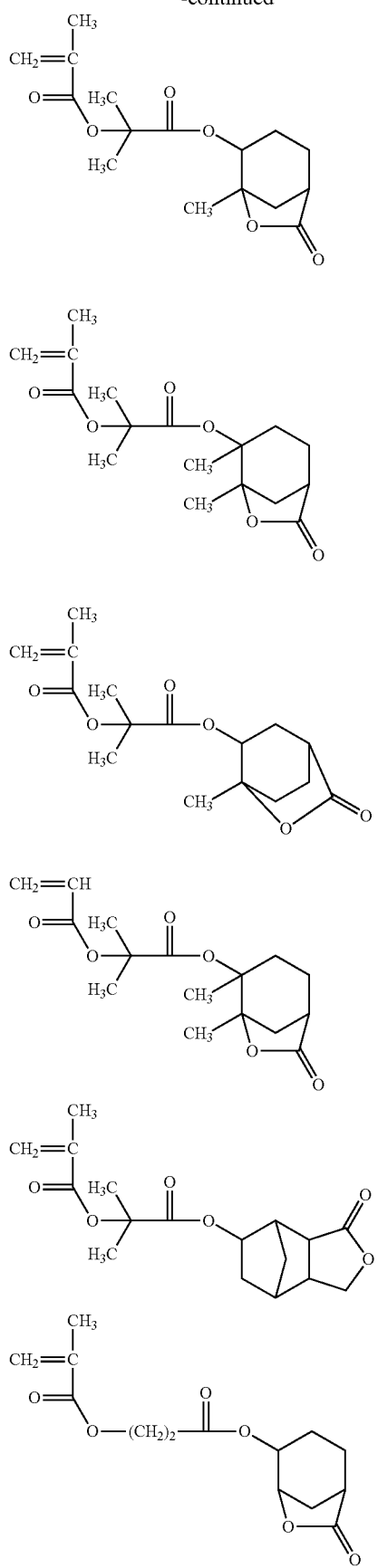
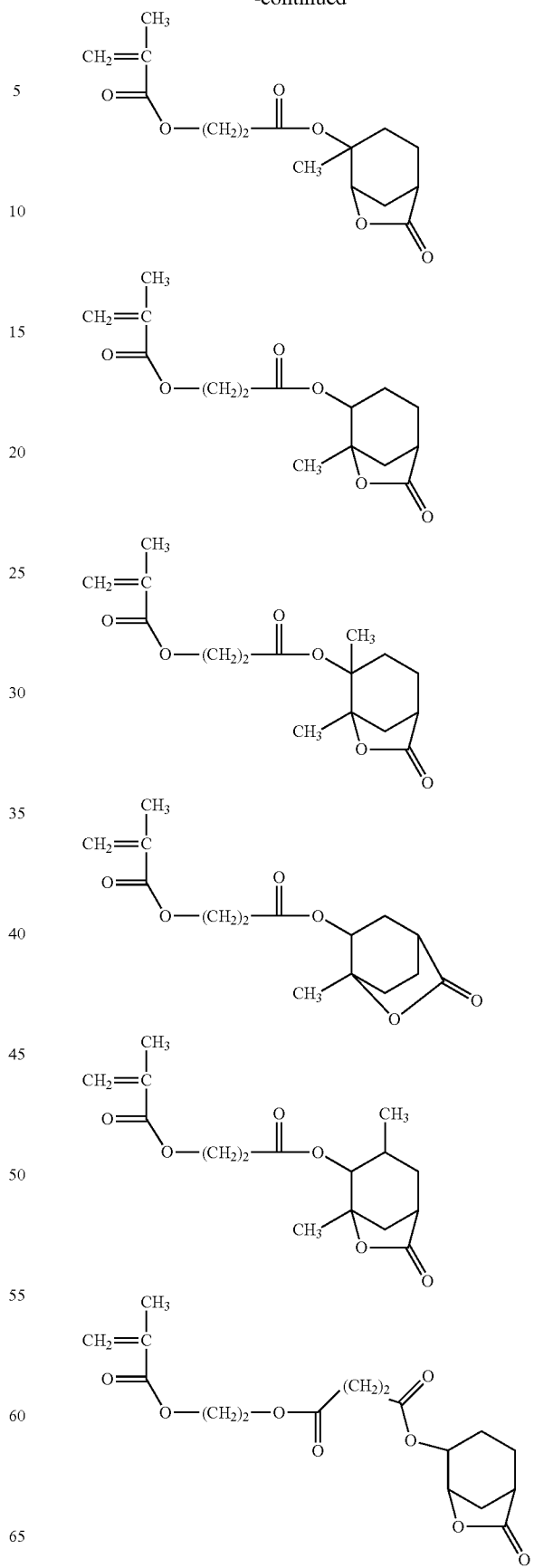

-continued

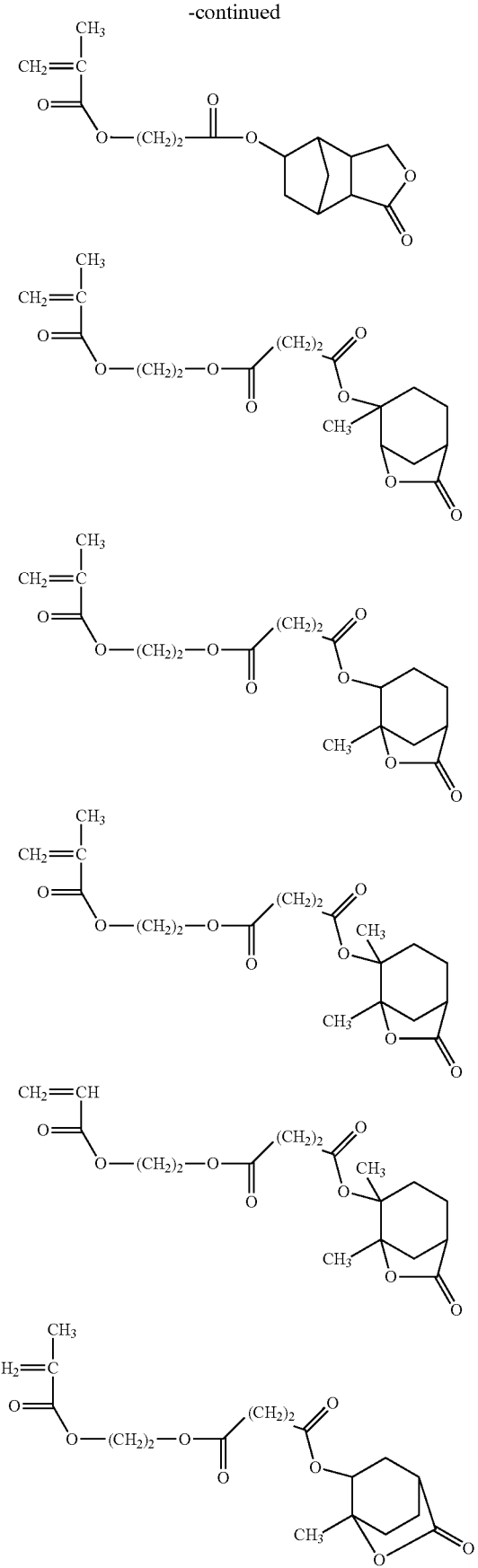

-continued

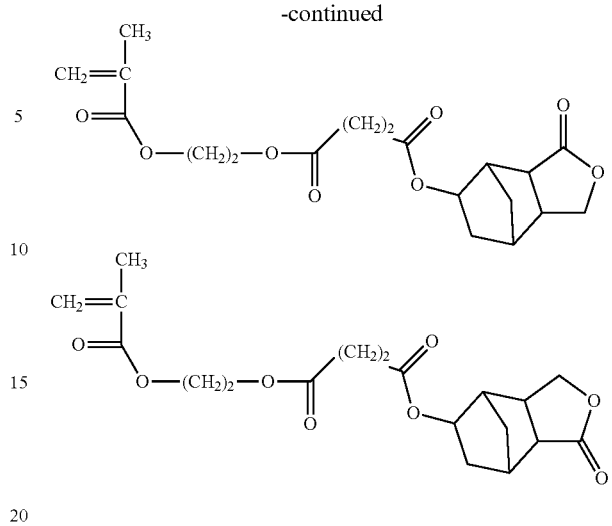

The arm portion of the star polymer of the present invention is preferably an arm portion having at least one repeating unit derived from the above (meth)acrylic ester, or an arm portion having at least one repeating unit selected from repeating units including the following constitution.

Specific examples of the repeating unit constituting the arm portion include the following repeating units:

(a) a repeating unit having a lactone ring and a repeating unit having an alicyclic skeleton, (b) a repeating unit having a lactone ring and a repeating unit having a tertiary carbon skeleton, (c) a repeating unit having a lactone ring and a repeating unit having an acid-decomposable/eliminable group, (d) a repeating unit having an alicyclic skeleton and a repeating unit having a tertiary carbon skeleton, and (e) a repeating unit having an alicyclic skeleton and a repeating unit having an acid-decomposable/eliminable group.

An arm portion containing a repeating unit having a lactone ring, a repeating unit having an alicyclic skeleton, a repeating unit having a tertiary carbon skeleton and a repeating unit having an acid-decomposable/eliminable group is preferably a repeating unit derived from a (meth)acrylic ester.

Also, an arm portion containing a repeating unit having a lactone ring, a repeating unit having an alicyclic skeleton, a repeating unit having a tertiary carbon skeleton and a repeating unit having an acid-decomposable/eliminable group is preferably a repeating unit derived from a (meth)acrylic ester having a lactone ring, an alicyclic skeleton, a tertiary carbon skeleton, and/or an acid-decomposable/eliminable group in the ester moiety thereof.

An arm portion containing a repeating unit derived from a (meth)acrylic ester having a tertiary carbon skeleton preferably has a tertiary carbon skeleton at the α-position of the ester oxygen. Carbon at the α-position of the ester oxygen of an arm portion containing a repeating unit derived from a (meth)acrylic ester having an alicyclic skeleton in the ester moiety thereof is preferably a tertiary carbon, and an arm portion containing a repeating unit having an alicyclic skeleton preferably contains a repeating unit derived from 2-alkyl-2-adamanthyl (meth)acrylate or isoadamanthyl (meth)acrylate.

Specific examples of the (meth)acrylic ester having a tertiary carbon skeleton in the ester moiety thereof include t-butyl acrylate, t-butyl methacrylate, 1,1-dimethylpropyl acrylate and 1,1-dimethylpropyl methacrylate.

If necessary, the arm portion of the star polymer of the present invention may contain, in addition to the repeating unit derived from the above (meth)acrylic ester, repeating units derived from the following (meth)acrylic esters:

acrylic esters such as methyl acrylate, ethyl acrylate, propyl acrylate, t-butyl acrylate, amyl acrylate, cyclohexyl acrylate, ethylhexyl acrylate, octyl acrylate, t-octyl acrylate, chloroethyl acrylate, 2-ethoxyethyl acrylate, 2,2-dimethyl-3-ethoxypropyl acrylate, 5-ethoxypentyl acrylate, 1-methoxyethyl acrylate, 1-ethoxyethyl acrylate, 1-methoxypropyl acrylate, 1-methyl-1-methoxyethyl acrylate, 1-(isopropoxy)ethyl acrylate, benzyl acrylate, methoxybenzyl acrylate, furfuryl acrylate and tetrahydrofurfuryl acrylate; methacrylic esters such as methyl methacrylate, ethyl methacrylate, propyl methacrylate, isopropyl methacrylate, amyl methacrylate, t-butyl methacrylate, hexyl methacrylate, cyclohexyl methacrylate, benzyl methacrylate, chlorobenzyl methacrylate, octyl methacrylate, 2-ethoxyethyl methacrylate, 4-methoxybutyl methacrylate, 5-methoxypentyl methacrylate, 2,2-dimethyl-3-ethoxypropyl methacrylate, 1-methoxyethyl methacrylate, 1-ethoxyethyl methacrylate, 1-methoxypropyl methacrylate, 1-methyl-1-methoxyethyl methacrylate, 1-(isopropoxy)ethyl methacrylate, furfuryl methacrylate and tetrahydrofurfuryl methacrylate;

crotonic esters such as methyl crotonate, ethyl crotonate, propyl crotonate, amyl crotonate, cyclohexyl crotonate, ethylhexyl crotonate, octyl crotonate, t-octyl crotonate, chloroethyl crotonate, 2-ethoxyethyl crotonate, 2,2-dimethyl-3-ethoxypropyl crotonate, 5-ethoxypentyl crotonate, 1-methoxyethyl crotonate, 1-ethoxyethyl crotonate, 1-methoxypropyl crotonate, 1-methyl-1-methoxyethyl crotonate, 1-(isopropoxy)ethyl crotonate, benzyl crotonate, methoxybenzyl crotonate, furfuryl crotonate and tetrahydrofurfuryl crotonate; and itaconic esters such as dimethyl itaconate, diethyl itaconate, dipropyl itaconate, diamyl itaconate, dicyclohexyl itaconate, bis(ethylhexyl) itaconate, dioctyl itaconate, di-t-octyl itaconate, bis(chloroethyl) itaconate, bis(2-ethoxyethyl) itaconate, bis(2,2-dimethyl-3-ethoxypropyl) itaconate, bis(5-ethoxypentyl) itaconate, bis(1-methoxyethyl) itaconate, bis(1-ethoxyethyl) itaconate, bis(1-methoxypropyl) itaconate, bis(1-methyl-1-methoxyethyl) itaconate, bis(1-(isopropoxy)ethyl) itaconate, dibenzyl itaconate, bis(methoxybenzyl) itaconate, difurfuryl itaconate and ditetrahydrofurfuryl itaconate.

The content ratio of each repeating unit in the arm portion of the star polymer according to the present invention can be optionally determined in accordance with the content ratio of the monomer used in the reaction. For example, the content of the repeating unit having a lactone ring is from 30 to 70% by mol, preferably from 35 to 65% by mol, and more preferably from 40 to 60% by mol in the entire repeating units of the arm portion. The content of the repeating unit having an alicyclic skeleton is usually from 20 to 75% by mol, preferably from 25 to 70% by mol, and more preferably from 30 to 65% by mol, in the entire repeating units of the arm portion. The content of the repeating unit having a structure other than the lactone ring and the alicyclic skeleton is usually from 0 to 70% by mol, preferably from 2 to 40% by mol, and preferably from 5 to 30% by mol in the entire monomer repeating units.

The number average molecular weight Mn of the arm portion relative to polystyrene standards as measured by using gel permeation chromatography is preferably within a range from 1,000 to 100,000, more preferably from 1,500 to 500,000, still more preferably from 2,000 to 200,000, and particularly preferably from 2,500 to 100,000. A ratio of the weight average molecular weight (Mw) to the number average molecular weight (Mn), (Mw/Mn), is preferably within a range from 1.01 to 3.00, more preferably from 1.01 to 2.00, and still more preferably from 1.01 to 1.50.

Examples of the method for producing a star polymer of the present invention include (1) a method containing the steps of anionically polymerizing a (meth)acrylic ester having an alicyclic skeleton and a lactone ring in the presence of an anionic polymerization initiator thereby to synthesize an arm polymer, and reacting the arm polymer with a polyacrylate; (2) a method containing the steps of reacting a polyacrylate in the presence of an anionic polymerization initiator to form a polyfunctional core, and anionically polymerizing a (meth)acrylic ester having an alicyclic skeleton and a lactone ring; and (3) a method containing the steps of anionically polymerizing a (meth)acrylic ester having an alicyclic skeleton and a lactone ring in the presence of an anionic polymerization initiator thereby to synthesize an arm polymer, reacting the arm polymer with a polyfunctional coupling agent, and reacting with an anionic polymerizable monomer. The above methods (1) and (3) are preferable so as to produce a star polymer having a controlled structure because the reaction can be controlled with ease.

Examples of the anionic polymerization initiator used in the anionic polymerization method include alkali metals and organic alkali metals. Examples of the alkali metal include lithium, sodium, potassium and cesium. Examples of the organic alkali metal include alkylated, allylated and arylated compounds of the alkali metals. Specific examples thereof include ethyllithium, n-butyllithium, sec-butyllithium, tert-butyllithium, ethylsodium, lithiumbiphenyl, lithiumnaphthalene, lithiumtriphenyl, sodium naphthalene, α-methylstyrene sodium dianion, 1,1-diphenylhexyllithium and 1,1-diphenyl-3-methylpentyllithium.

The polymerization reaction used for the synthesis of the arm polymer in method (1) or (3) can be conducted by either a method of adding dropwise an anionic polymerization initiator in a monomer (mixed) solution or a method of adding dropwise a monomer (mixed) solution in a solution containing an anionic polymerization initiator, but the method of adding dropwise a monomer (mixed) solution in a solution containing an anionic polymerization initiator is preferable because the molecular weight and the molecular weight distribution can be controlled. This method for synthesizing an arm polymer is usually conducted under an atmosphere of an inert gas such as nitrogen or argon in an organic solvent at a temperature within a range from −100 to 50° C., and preferably from −100 to 40° C.

Examples of the organic solvent used in the method for synthesizing an arm polymer include organic solvents which are usually used in the anionic polymerization, such as aliphatic hydrocarbons such as n-hexane and n-heptane; alicyclic hydrocarbons such as cyclohexane and cyclopentane; aromatic hydrocarbons such as benzene and toluene; ethers such as diethylether, tetrahydrofuran (THF) and dioxane; anisole, and hexamethylphosphoramide. These organic solvents may be used alone or in combination with at least two kinds thereof. Among these organic solvents, a mixed solvent of tetrahydrofuran and toluene, a mixed solvent of tetrahydrofuran and hexane, and a mixed solvent of tetrahydrofuran and methylcyclohexane are preferably exemplified in view of polarity and solubility.

Examples of the polymerization form of the arm polymer include a random copolymer in which each component is statistically distributed in the entire copolymer chain thereof, partial block copolymer, and complete block copolymer. These copolymers can be synthesized by selecting the method of adding (meth)acrylic esters to be used.

The reaction of producing a star polymer including the arm polymer thus obtained as a branched polymer chain can be conducted by further adding the above polyacrylate to the reaction solution after the completion of the reaction for the synthesis of the arm polymer. When this reaction is conducted under an atmosphere of an inert gas such as nitrogen or argon in an organic solvent at a temperature within a range from −100° C. to 50° C., and preferably from −70° C. to 40° C., a polymer having a controlled structure with a narrow molecular weight distribution can be obtained. The reaction for producing a star polymer can also be continuously conducted in a solvent used to form the arm polymer, or the reaction can be conducted by adding a solvent thereby to change the composition or conducted by substituting the solvent with another solvent. As the solvent, the same solvent as that used in the reaction for synthesizing an arm polymer can be used.

In the method for producing a star polymer of the present invention, a molar ratio of a polyacrylate (P) to an active end (D) of a polymer chain, such as (meth)acrylic ester having an alicyclic skeleton and a lactone ring, polymerized by an anionic polymerization method using an anionic polymerization initiator as a polymerization initiator, [(P)/(D)], is preferably controlled within a range from 0.1 to 10. In the reaction between the arm polymer chain and the polyacrylate, both a method of adding a polyacrylate to an arm polymer chain having an active end and a method of adding an arm polymer chain having an active end to a polyacrylate can be employed.

The number of arms of the star polymer is decided in accordance with the amount of polyacrylate added, the reaction temperature and the reaction time. However, plural star block copolymers each having a different number of arms are simultaneously produced as a result of an influence of a difference in reactivity between a living polymer end and a vinyl group of the polyacrylate as well as steric hindrance. The ratio of the weight average molecular weight (Mw) to the number average molecular weight (Mn) of the resulting star polymer, (Mw/Mn), is preferably within a range from 1.00 to 1.50 and the number average molecular weight is preferably within a range from 3,000 to 300,000.

According to the method (3) containing the steps of reacting a central nucleus having an active end (polyfunctional core) formed by reacting a previously prepared arm polymer chain with a polyacrylate with an anionic polymerizable monomer to form a new arm polymer chain, a star polymer having different kinds of arm polymer chains can be produced. Although the active end existing in the central nucleus may be directly reacted with a monomer polymerizable therewith, it may be more advantageous in terms of controlling the entire structure of the star polymer to be produced, when the monomer is a highly reactive monomer such as an acrylic acid derivative, to react the monomer after reacting a compound such as diphenylethylene or stilbene or adding an alkali metal such as lithium chloride or a mineral acid salt of an alkali earth metal, because the polymerization reaction can be allowed to proceed slowly. The above reaction can also be continuously conducted in a solvent used to form a central nucleus having an active end, and also can be conducted by adding a solvent thereby to change the composition, or conducted by substituting the solvent with another solvent. As the solvent, the same solvent as that used in the reaction for synthesizing an arm polymer can be used. A random-copolymerized polymer chain can be obtained by mixing, as the arm polymer chain introduced additionally into the active end existing in the central nucleus in method (3) or the arm polymer chain in the method (2), two kinds of monomers and reacting them, and a block polymer chain can be obtained by adding two kinds of monomers in order. It is also possible to introduce a functional group into the end by adding carbon dioxide, an epoxy, or the like, after the completion of the reaction.

The present invention will now be described in detail by way of examples, but the scope of the present invention is not limited to the following examples.

EXAMPLE 1

Under a nitrogen atmosphere, 331 g of tetrahydrofuran (THF) containing 13 mmol of lithium chloride was maintained at −40° C. and 26 mmol of sec-butyllithium (SBL) was added while stirring, and then 88 g of a THF solution containing 97 mmol of 2-methyl-2-adamanthyl methacrylate (2MAdMA), 78 mmol of a mixture (TLMA) of (±)-octahydro-3-oxo-4,7-methanoisobenzofuran-5-ylmethacrylate and a (±)-octahydro-1-oxo-4,7-methanoisobenzofuran-5-ylmethacrylate as a positional isomer and 19 mmol of tert-butyl methacrylate (tBMA) was added dropwise and the reaction was continued for 30 minutes. A small amount of the reaction solution was taken out from the reaction system and gas chromatography (hereinafter, abbreviated as GC) analysis revealed that the monomer was completely consumed.

Then, 12 g of a THF solution containing 22 mmol of 2,5-dimethyl-2,5-hexanediol dimethacrylate (MDMA) was added dropwise and the reaction was continued for 30 minutes. A small, amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water so as to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer. GPC analysis of the resulting polymer was conducted. As a result, the star polymer portion had Mw of 29,400, Mw/Mn of 1.23 and an area of 67%, and the arm polymer portion had Mw of 4,800, Mw/Mn of 1.19 and an area of 33%. $^{13}$C-NMR analysis revealed that this polymer had a composition ratio 2MAdMA:TLMA:tBMA:MDMA of 46:31:11:12 (molar ratio).

EXAMPLE 2

Under a nitrogen atmosphere, 233 g of THF containing 15 mmol of lithium chloride was maintained at −40° C. and 31 mmol of SBL was added while stirring, and then 171 g of a THF solution containing 88 mmol of 2MAdMA, 88 mmol of methacrylic acid-5-oxo-4-oxatricyclo[4.2.1.0$^{3,7}$]nonan-2-yl (NLMA) and 19 mmol of tBMA was added dropwise and the reaction was continued for 30 minutes. A small amount of the reaction solution was taken out from the reaction system and GC analysis revealed that the monomer was completely consumed.

Then, 12 g of a THF solution containing 22 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer. GPC analysis of the resulting polymer was conducted. As a result, the star polymer portion had Mw of 32,700, Mw/Mn of 1.23 and an area of 52%, and the arm polymer portion had Mw of 5,400, Mw/Mn of 1.20 and an area of 48%. $^{13}$C-NMR analysis revealed that this polymer had a composition ratio 2MAdMA:NLMA:tBMA:MDMA of 43:37:9:11 (molar ratio).

EXAMPLE 3

Under a nitrogen atmosphere, 341 g of THF containing 7 mmol of lithium chloride was maintained at −40° C. and 14 mmol of SBL was added while stirring, and then 10 g of a THF solution containing 22 mmol of 2MAdMA was added dropwise and the reaction was continued for 30 minutes. A small amount of the reaction solution was taken out from the reaction system and GC analysis revealed that the 2MAdMA monomer was completely consumed. Then, 78 g of a THF solution containing 66 mmol of 2MAdMA, 88 mmol of TLMA and 19 mmol of tBMA was added dropwise and the reaction was continued for 30 minutes. A small amount of the reaction solution was taken out from the reaction system and GC analysis revealed that the monomer was completely consumed.

Then, 12 g of a THF solution containing 22 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer in which a 2MAdMA unit is arranged in the outermost shell. GPC analysis of the resulting polymer was conducted. As a result, the star polymer portion had Mw of 21,400, Mw/Mn of 1.23 and an area of 62%, and the arm polymer portion had Mw of 3,800, Mw/Mn of 1.13 and an area of 38%. $^{13}$C-NMR analysis revealed that this polymer had a composition ratio 2MAdMA:TLMA:tBMA:MDMA of 43:37:10:11 (molar ratio).

EXAMPLE 4

Under a nitrogen atmosphere, 343 g of THF containing 5 mmol of lithium chloride was maintained at −40° C. and 11 mmol of SBL was added while stirring, and then 10 g of a THF solution containing 22 mmol of 2MAdMA was added dropwise and the reaction was continued for 30 minutes. A small amount of the reaction solution was taken out from the reaction system and GC analysis revealed that the 2MAdMA monomer was completely consumed. Then, 78 g of a THF solution containing 79 mmol of 2MAdMA, 74 mmol of TLMA and 19 mmol of tBMA was added dropwise and the reaction was continued for 30 minutes. A small amount of the reaction solution was taken out from the reaction system and GC analysis revealed that the monomer was completely consumed.

Then, 12 g of a THF solution containing 22 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer in which a 2MAdMA unit is arranged in the outermost shell. GPC analysis of the resulting polymer was conducted. As a result, the star polymer portion had Mw of 25,400, Mw/Mn of 1.23 and an area of 62%, and the arm polymer portion had Mw of 4,400, Mw/Mn of 1.15 and an area of 38%. $^{13}$C-NMR analysis revealed that this polymer had a composition ratio 2MAdMA:TLMA:tBMA:MDMA of 48:32:10:11 (molar ratio).

EXAMPLE 5

Under a nitrogen atmosphere, 256 g of THF containing 7 mmol of lithium chloride was maintained at −40° C. and 14 mmol of SBL was added while stirring, and then 10 g of a THF solution containing 22 mmol of 2MAdMA was added dropwise and the reaction was continued for 30 minutes. A small amount of the reaction solution was taken out from the reaction system and GC analysis revealed that the 2MAdMA monomer was completely consumed. Then, 151 g of a THF solution containing 66 mmol of 2MAdMA, 88 mmol of NLMA and 19 mmol of tBMA was added dropwise and the reaction was continued for 30 minutes. A small amount of the reaction solution was taken out from the reaction system and GC analysis revealed that the monomer was completely consumed.

Then, 12 g of a THF solution containing 22 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer in which a 2MAdMA unit is arranged in the outermost shell. GPC analysis of the resulting polymer was conducted. As a result, the polymer had Mw of 29,900 and Mw/Mn of 1.26. 13C-NMR analysis revealed that this polymer had a composition ratio 2MAdMA:NLMA:tBMA:MDMA of 40:42:8:10 (molar ratio).

EXAMPLE 6

Under a nitrogen atmosphere, 315 g of THF containing 7 mmol of lithium chloride was maintained at −40° C. and 14 mmol of SBL was added while stirring, and then 9 g of a THF solution containing 22 mmol of 1-ethyl-1-cyclohexyl methacrylate (ECHMA) was added dropwise and the reaction was continued for 30 minutes. A small amount of the reaction solution was taken out from the reaction system and GC analysis revealed that the ECHMA monomer was completely consumed. Then, 72 g of THF solution containing 66 mmol of ECHMA, 88 mmol of TLMA and 19 mmol of tBMA was added dropwise and the reaction was continued for 30 minutes. A small amount of the reaction solution was taken out from the reaction system and GC analysis revealed that the monomer was completely consumed.

Then, 12 g of a THF solution containing 22 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer in which a ECHMA unit is arranged in the outermost shell. GPC analysis of the resulting polymer was conducted. As a result, the star polymer portion had Mw of 24,100, Mw/Mn of 1.22 and an area of 64%, and the arm polymer portion had Mw of 3,600, Mw/Mn of 1.19 and an area of 36%. $^{13}$C-NMR analysis revealed that this polymer had a composition ratio ECHMA:TLMA:tBMA:MDMA of 42:37:10:11 (molar ratio).

EXAMPLE 7

Under a nitrogen atmosphere, 315 g of THF containing 7 mmol of lithium chloride was maintained at −40° C. and 15 mmol of SBL was added while stirring, and then 9 g of a THF solution containing 32 mmol of 1-(1-methacryloyloxy-1-methylethyl)adamantane (IAMA) was added dropwise and the reaction was continued for 30 minutes. A small amount of the reaction solution was taken out from the reaction system and GC analysis revealed that the IAMA monomer was completely consumed. Then, 74 g of THF solution containing 53 mmol of IAMA, 85 mmol of TLMA and 19 mmol of tBMA was added dropwise and the reaction was continued for 30 minutes. A small amount of the reaction solution was taken out from the reaction system and GC analysis revealed that the monomer was completely consumed.

Then, 13 g of a THF solution containing 24 mmol of MDMA was added dropwise and the reaction was continued for 30 minutes. A small amount of the reaction solution was taken out from the reaction system and GC analysis revealed that the MDMA monomer was completely consumed, and then the reaction was terminated by the THF solution containing hydrochloric acid. The reaction-terminated solution was poured into a large amount of water thereby to precipitate a polymer, which was collected by filtration, washed and then dried to obtain a white powdered polymer. The resulting polymer was redissolved in THF and the solution was poured into a large amount of methanol thereby to precipitate a polymer, which was collected by filtration, washed and then vacuum-dried for 10 hours to obtain a white powdered star polymer in which an IAMA unit is arranged in the outermost shell. GPC analysis of the resulting polymer was conducted. As a result, the star polymer portion had Mw of 30,000, Mw/Mn of 1.27 and an area of 52%, and the arm polymer portion had Mw of 3,400, Mw/Mn of 1.21 and an area of 48%. $^{13}$C-NMR analysis revealed that this polymer had a composition ratio IAMA:TLMA:tBMA:MDMA of 40:40:9:11 (molar ratio).

What is claimed is:

1. A method of producing a star polymer, the method comprising:

anionically polymerizing, in the presence of an anionic polymerization initiator and lithium chloride to synthesize an arm polymer, a (meth)acrylic ester represented by formula (II):

where:

$R_4$ represents a hydrogen atom or a methyl group; and $R_5$ represents an organic group;

reacting the arm polymer with a polyacrylate that has at least two partial structures represented by formula (I):

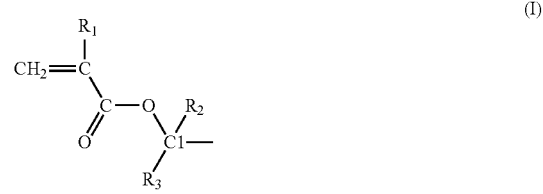

where:

$R_1$ represents a hydrogen atom or a methyl group;

$R_2$ and $R_3$ each independently represents an organic group that is directly bound to C1 via a carbon-carbon bond; and C1 represents a carbon atom that is directly bound to a moiety via a carbon-carbon bond;

wherein:

the anionic polymerization initiator is ethyllithium, n-butyllithium, sec-butyllithium, or tert-butyllithium;

a homopolymer chain having a repeating unit derived from the (meth)acrylic ester in which $R_5$ is a C1-C4 alkyl group is excluded as the arm polymer when $R_1$ in formula (I) is a methyl group;

a ratio of a weight average molecular weight of the star polymer to a number average molecular weight of the star polymer is from 1.00 to 1.27; and wherein a temperature is maintained at from −40° C. to 40° C.

2. The method of producing a star polymer according to claim 1, wherein the polyacrylate that has at least two partial structures represented by formula (I) is a diacrylate represented by formula (III):

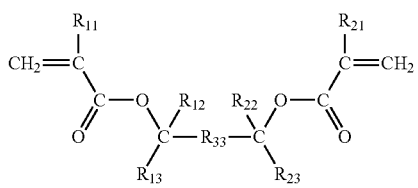

(III)

where:
- $R_{11}$ and $R_{21}$ each independently represents a hydrogen atom or a methyl group;
- $R_{12}$, $R_{13}$, $R_{22}$, and $R_{23}$ each independently represents an organic group directly bound to a carbon atom via a carbon-carbon bond; and
- $R_{33}$ represents a divalent linking group.

3. The method of producing a star polymer according to claim 2, wherein $R_{33}$ in formula (III) is an unsubstituted or substituted alkylene group.

4. The method of producing a star polymer according to claim 1, wherein $R_5$ in formula (II) is an organic group having an alicyclic hydrocarbon skeleton or an organic group having a lactone ring.

5. The method of producing a star polymer according to claim 4, wherein $R_5$ in formula (II) is an organic group represented by formula (V):

-A-B    (V)

where:
- A represents a single bond, an ether group, an ester group, a carbonyl group, an alkylene group, or a divalent group as a combination thereof; and
- B represents any one of the following formulas (VI-1) to (VI-6):

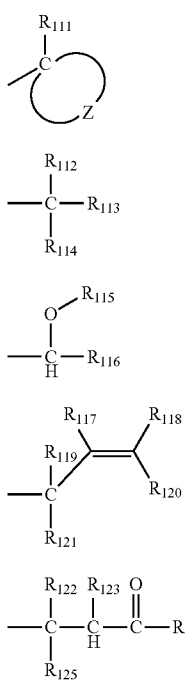

(VI-1)

(VI-2)

(VI-3)

(VI-4)

(VI-5)

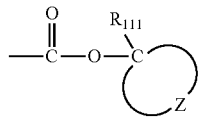

(VI-6)

where:
- $R^{111}$ represents a C1-C5 alkyl group;
- Z represents an atomic group required to form an alicyclic hydrocarbon group together with a carbon atom;
- $R^{112}$ to $R^{116}$ each independently represents a hydrocarbon, a C1-C4 alkyl group, or an alicyclic hydrocarbon group, provided that at least one of $R^{112}$ to $R^{114}$, and either $R^{115}$ or $R^{116}$ each represents an alicyclic hydrocarbon group;
- $R^{117}$ to $R^{121}$ each independently represents a hydrogen atom, a C1-C4 alkyl group, or an alicyclic hydrocarbon group, provided that at least one of $R^{117}$ to $R^{121}$ represents an alicyclic hydrocarbon group, and either $R^{119}$ or $R^{121}$ represents a C1-C4 alkyl group or an alicyclic hydrocarbon group; and
- $R^{122}$ to $R^{125}$ each independently represents a hydrogen atom, a C1-C4 alkyl group, or an alicyclic hydrocarbon group, provided that at least one of $R^{122}$ to $R^{125}$ represents an alicyclic hydrocarbon group.

6. The method of producing a star polymer according to claim 5, wherein $R_5$ in formula (II) is an 1-adamanthyl group or a 2-adamanthyl group.

7. The method of producing a star polymer according to claim 5, wherein A in formula (V) is a divalent group represented by one of the following formulae:

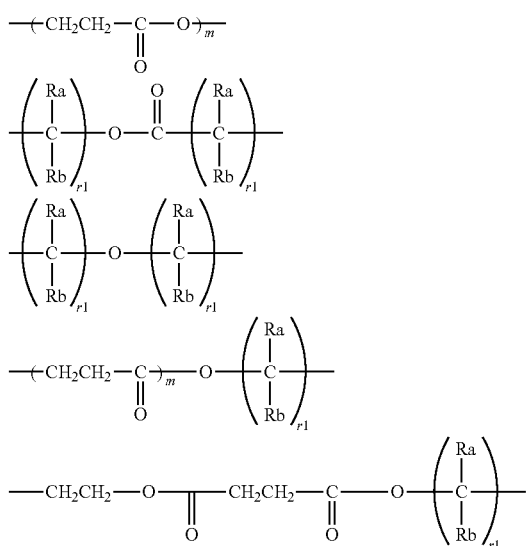

where:
- Ra and Rb each independently represents a hydrogen atom, an alkyl group which is unsubstituted or substituted by a halogen atom or an alkoxy group, a halogen atom, or an alkoxy group;
- r1 represents an integer of from 1 to 10; and
- m represents an integer of from 1 to 3.

8. The method of producing a star polymer according to claim 4, wherein $R_5$ in formula (II) is an organic group represented by formula (VIII):

-A-C  (VIII)

where:

A is a divalent group represented by one the following formulae:

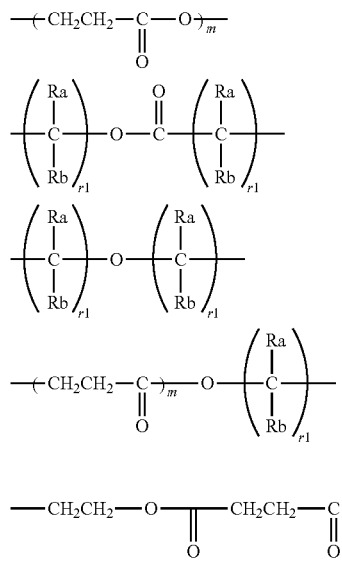

where:

Ra and Rb each independently represents a hydrogen atom, an alkyl group which is unsubstituted or substituted by a halogen atom or an alkoxy group, a halogen atom, or an alkoxy group;

r1 represents an integer of from 1 to 10; and m represents an integer of from 1 to 3; and C in the formula (VIII) represents any one of the following formulae (IX-1) to (IX-5):

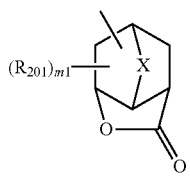 (IX-1)

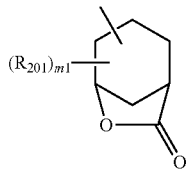 (IX-2)

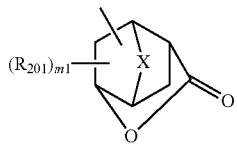 (IX-3)

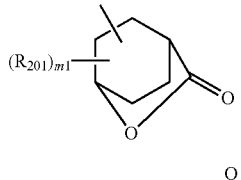 (IX-4)

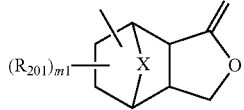 (IX-5)

where:

X represents an oxygen atom, a sulfur atom, or an alkylene group;

$R_{201}$ represents an alkyl group, a cycloalkyl group, or an alkenyl group; and m1 represents 0 or an integer of from 1 to 5;

wherein when m1 is 2 or more, each $R_{201}$ is identical or different from each other, or is combined with each other to form a ring.

* * * * *